(12) United States Patent
Shafiee et al.

(10) Patent No.: US 8,768,748 B2
(45) Date of Patent: *__Jul. 1, 2014__

(54) RESOURCE MANAGER

(75) Inventors: Mohammad Reza Shafiee, Ridgefield, CT (US); Wei Liu, Flower Mound, TX (US); Puneet Kalia, Hyderabad (IN); Ashutosh K. Sureka, Irving, TX (US); Rahim Charania, Euless, TX (US); Shuchi Patel, Frisco, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 450 days.

This patent is subject to a terminal disclaimer.

(21) Appl. No.: 12/971,029

(22) Filed: Dec. 17, 2010

(65) Prior Publication Data

US 2012/0158530 A1 Jun. 21, 2012

(51) Int. Cl.
| | | |
|---|---|---|
| *G06Q 10/00* | (2012.01) | |
| *G06Q 30/00* | (2012.01) | |
| *G06F 17/00* | (2006.01) | |
| *G06G 7/00* | (2006.01) | |
| *G06Q 30/02* | (2012.01) | |
| *G06Q 10/06* | (2012.01) | |

(52) U.S. Cl.
CPC ........ *G06Q 30/0283* (2013.01); *G06Q 10/0631* (2013.01)

USPC .......................... 705/7.35; 705/400; 705/7.12

(58) Field of Classification Search
CPC ....................... G06Q 30/0283; G06Q 10/0631
USPC ......................................... 705/7.35, 400, 7.12
See application file for complete search history.

(56) References Cited

U.S. PATENT DOCUMENTS

| | | | | |
|---|---|---|---|---|
| 5,768,521 | A | * | 6/1998 | Dedrick ........................ 709/224 |
| 6,651,099 | B1 | * | 11/2003 | Dietz et al. .................... 709/224 |
| 6,922,389 | B1 | * | 7/2005 | Lundby ........................ 370/209 |
| 7,730,119 | B2 | * | 6/2010 | Bates et al. .................... 709/201 |
| 2005/0177549 | A1 | * | 8/2005 | Hornick ............................ 707/1 |
| 2005/0283784 | A1 | * | 12/2005 | Suzuki .......................... 718/100 |
| 2006/0089922 | A1 | * | 4/2006 | Flores et al. ................... 705/500 |
| 2008/0301418 | A1 | * | 12/2008 | Khailany et al. ............... 712/227 |
| 2009/0328046 | A1 | * | 12/2009 | Proctor et al. ................. 718/102 |
| 2010/0114786 | A1 | * | 5/2010 | Aboujaoude et al. ......... 705/301 |
| 2010/0177345 | A1 | * | 7/2010 | Watanabe .................... 358/1.15 |
| 2011/0184964 | A1 | * | 7/2011 | Li ................................. 707/756 |
| 2012/0131591 | A1 | * | 5/2012 | Moorthi et al. ............... 718/104 |
| 2012/0177037 | A1 | * | 7/2012 | Balassanian .................. 370/389 |

* cited by examiner

*Primary Examiner* — Allen J Jung

(57) ABSTRACT

A method may include receiving an order associated with processing a media file and generating a workflow associated with fulfilling the order. The method may also include identifying tasks associated with the workflow and generating an estimate associated with executing the tasks. The method may further include allocating resources associated with executing the tasks and scheduling execution of the order.

18 Claims, 11 Drawing Sheets

RESOURCE MANAGER

BACKGROUND INFORMATION

Consumer demand for media is increasing. For example, consumers often watch and/or listen to various media at home, while traveling, at work, etc. As a result, the number of communication channels for delivering media content and the number of different types of devices for playing the content has also increased.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein relate to an infrastructure for allowing customers to submit orders for processing content, such as media content. The infrastructure facilitates processing of the orders using workflows that represent tasks to be performed. The infrastructure may also generate estimates, such as time and cost estimates, associated with processing an order. The infrastructure may further provide for managing resources associated with fulfilling orders, such as scheduling and reserving resources to fulfill the orders, to enable the orders to be executed in an efficient manner.

Figure 1:
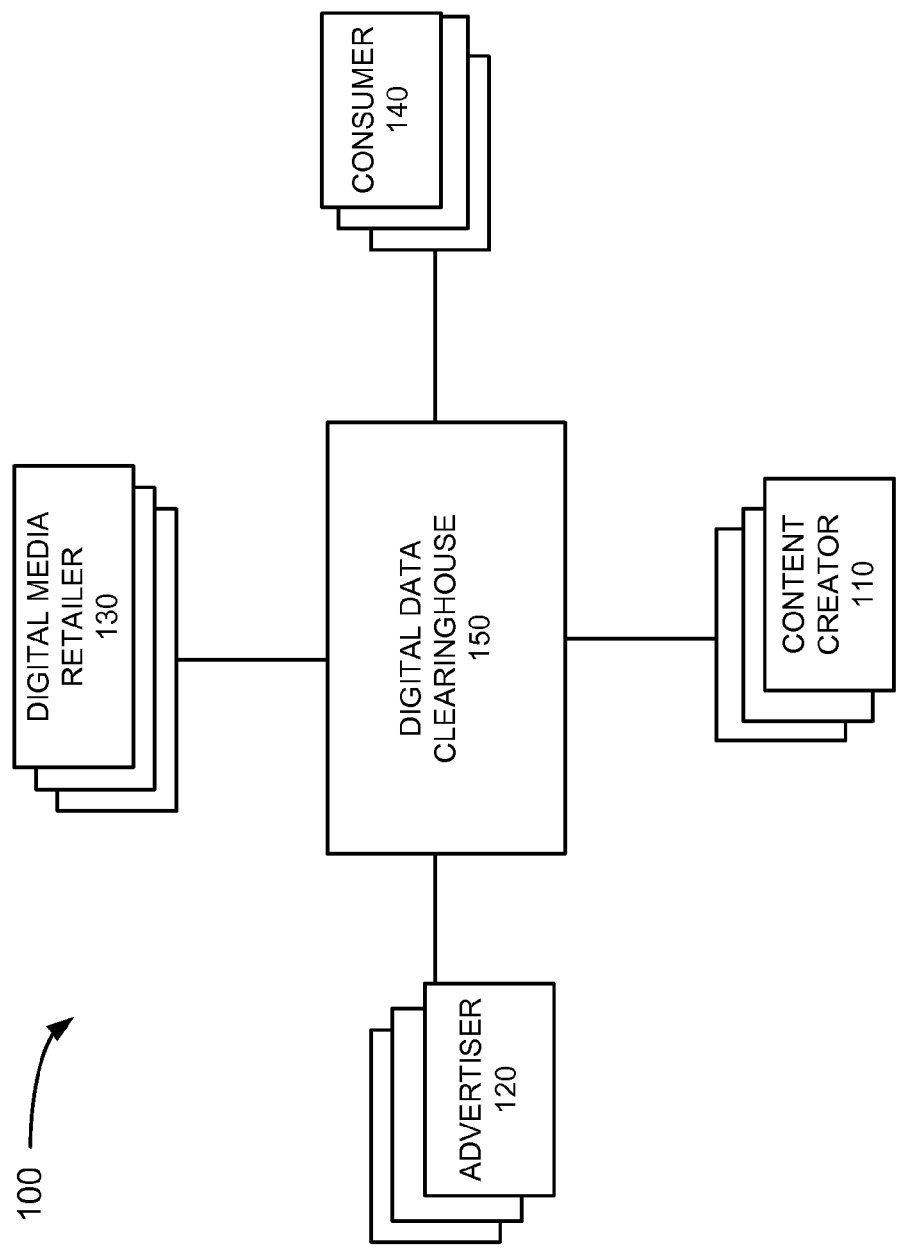
FIG. 1 schematically illustrates an exemplary network in which systems and methods described herein may be implemented.

FIG. 1 is a block diagram of an exemplary network in which systems and methods described herein may be implemented. Referring to FIG. 1, network 100 includes one or more content creators 110, one or more advertisers 120, one or more digital media retailers (DMRs) 130, one or more consumers 140 and digital data clearinghouse (DDC) 150. The exemplary configuration illustrated in FIG. 1 is provided for simplicity. It should be understood that a typical network may include more or fewer devices than illustrated in FIG. 1.

Content creator 110 (referred to collectively as content creators 110 or individually as content creator 110) may represent one or more creators of content that wish to package and/or distribute the content to other parties, such as consumers 140. For example, content creators 110 may include movie or television studios, music companies, publishers, game developers, parties who generate user generated content (UGC), websites, blogsites, etc. Content creators 110 may provide content to DDC 150 for transcoding, packaging and/or distribution, as described in detail below. The term "content," as used herein, may include any type of media, such as video, audio, multi-media, textual data, etc. The term "content" may also be referred to herein as "video assets" or "assets."

Advertiser 120 (referred to collectively as advertisers 120 or individually as advertiser 120) may represent one or more parties that wish to insert advertising into media files. For example, advertiser 120 may contract with a content creator 110 and/or digital media retailer 130 to insert an advertisement into a media stream provided to consumers 140. DDC 150 may insert the advertisement into the stream in accordance with the agreement between the parties.

DMR 130 may represent one or more business entities that receive media content from various parties and resell it to end users. For example, DMRs 130 may include broadcasters, cable companies, direct broadcast satellite (DBS) providers, Internet protocol television (IPTV) providers, mobile phone TV providers, online retailers, etc. DMRs 130 may receive media content from DDC 150 and sell/provide the content to consumers 140.

Consumer 140 may represent one or more consumers 140 that receive content originally generated by or provided by content creators 110 and that has been processed by DDC 150. For example, DDC 150 may format and package content for distribution by DMRs 130 and/or DDC 150 to consumers 140.

DDC 150 may include a server/computing device or a set of servers/computing devices associated with, for example, processing media content. For example, as described briefly above, DDC 150, also referred to herein as DDC platform 150, may provide an automated environment in which content from content creators 110 is transformed and packaged for distribution in any number of formats, based on the particular requirements associated with DMRs 130. In an exemplary implementation, DDC 150 may also aggregate various data and insert advertisements into the media content. DDC 150, consistent with implementations described herein, may also utilize flexible workflows to streamline the formatting and packaging of content for digital distribution.

As described above, the exemplary configuration illustrated in FIG. 1 is provided for simplicity. It should be understood that a typical network may include more or fewer devices than illustrated in FIG. 1. For example, it should be understood that network 100 may include a large number (e.g., hundreds or thousands) of different types of user devices associated with consumers 140, such as televisions, cellular telephones, personal computers (PCs), laptop computers, tablet computers, notebook computers, netbook computers, personal digital assistants (PDAs), etc.

It should also be understood network 100 may include one or more wired, wireless and/or optical networks (not shown) that interconnect the components illustrated in FIG. 1 and enable the components in FIG. 1 to communicate with one another. For example, network 100 may include one or more public switched telephone networks (PSTNs) or other type of switched network. Network 100 may also include one or more wireless networks and may include a number of transmission towers for receiving wireless signals and forwarding the wireless signals toward the intended destination. Network 100 may further include one or more satellite networks, one or more packet switched networks, such as an Internet protocol (IP) based network, a local area network (LAN), a wide area network (WAN), an intranet, the Internet, or another type of network that is capable of transmitting data from a source device to a destination device.

Further, various functions are described below as being performed by particular components in network 100. In other implementations, various functions described below as being performed by one device may be performed by another device or multiple devices, and various functions described as being performed by multiple devices may be combined and performed by a single device.

Figure 2:
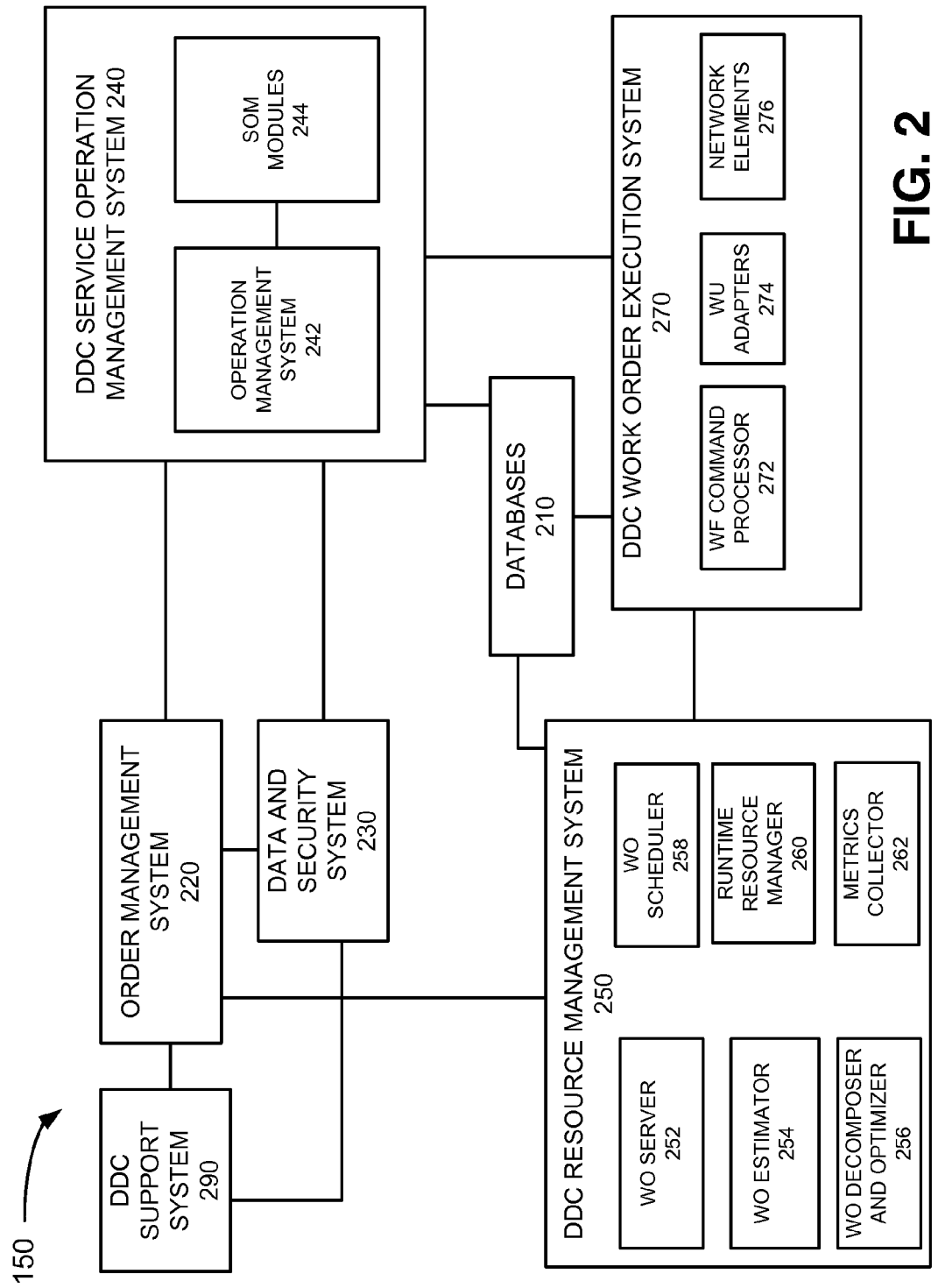
FIG. 2 illustrates an exemplary architecture associated with one of the components of FIG. 1 in which systems and methods described herein may be implemented.

FIG. 2 illustrates an exemplary configuration of DDC 150. Referring to FIG. 2, DDC 150 may include databases 210, order management system 220, data and security system 230, DDC service operation management (SOM) system 240, DDC resource management system 250, DDC work order execution (WOE) system 270 and DDC support system 290.

Databases 210 may store work unit definitions, workflows, parameters, tables that are associated with various components in DDC 150, intermediate or end results of processing performed by different processes in DDC 150, etc. The term "work unit," as used herein, may refer to a description of a set of one or more operations that a system may perform on content (e.g., overlaying subtitles on a video, inserting advertisements into a video, reformatting a video, etc.).

Order management system 220 may include one or more computing devices or servers for managing customer orders, generating reports, etc. In an exemplary implementation, order management system 220 may include client components that interface with components on DDC service operation management system 240. The client components (e.g., web browser) may receive customer orders, requests for reports, etc., and relay the received information to the components on DDC service operation management system 240 for the creation, validation, estimation, submission, approval, execution and reporting of activities associated with the customer orders, request for reports, etc. For example, a customer order may be completed by sending, to a component on DDC service operation management system 240, a selection of a particular workflow that will drive the processing of content associated with the order.

Data and security system 230 may include one or more computing devices or servers that provide for authentication and authorization of users having roles in DDC 150 and/or for taking actions that are associated with the authorized roles (e.g., create user accounts, remove user accounts, generate an initial password, etc.). For example, when a user logs in as a DDC operator, the user may be authorized to design work units and/or compose workflows. In an exemplary implementation, data and security system 230 may interface with order management system 220, DDC SOM system 240 and DDC support system 290.

DDC service operation management (SOM) system 240 may include one or more servers or computing devices to control the overall operation, configuration, and management of DDC 150. For example, DDC SOM system 240 may include operation management system 242 and SOM modules 244. Via a client component that communicates with operation management system 242, a user may control the configuration, administration and operation of DDC 150. For example, in one implementation, via a web browser or another client application, a user may control security, compose a workflow, administer accounts that are associated with content creator 110 or DMR 130, submit a work order, add data and storage to DDC 150, manage resources, manage DDC configuration (e.g., create a work unit), manage catalogs of content, run reports, monitor DDC work order (e.g., information associated with a work order), etc.

In providing each of such services to a client, operation management system 242 may employ SOM modules 244. SOM modules 244 may include components/modules that correspond to the above-listed services. For example, SOM modules 244 may include a security manager, workflow manager, account manager, work order manager, data and storage manager, resource management module, configuration manager, asset management module, catalog management module, monitoring and reporting module, etc. DDC SOM system 240 may further include an operational graphical user interface (GUI) for interfacing with SOM modules.

DDC resource management system 250 may include one or more servers or computing devices that support the capacity management of resources associated with network elements (NEs) in DDC 150. As illustrated in FIG. 2, DDC resource management system 250 may include work order (WO) server 252, WO estimator 254, WO decomposer and optimizer 256, WO scheduler 258, runtime resource manager 260 and metrics collector 262. Components 252-262 may aid in scheduling and allocating resources associated with fulfilling customer orders, as described in detail below.

WO server 252 may provide work order-related interfaces to operation management system 242 and/or SOM modules 244, and may communicate with WO estimator 254, WO decomposer and optimizer 256, and WO scheduler 258 to submit, decompose, validate, and save work orders, and to estimate, schedule, and reserve resources during the order submission.

Work order estimator 254 may estimate the cost of completing a decomposed work order across work units of a workflow, based on resources that are associated with the work units for each resource type. Work order estimator 254 may store the cost in one of databases 210 in terms of resource capacity units (RCUs) and duration of time required to complete tasks or processes that are associated with the work order.

WO decomposer and optimizer 256 may break down an order into work units based on the workflow associated with the order. Furthermore, based on the decomposition, WO decomposer and optimizer 256 may generate work unit tasks, or simply "tasks," assign task parameters, and create task connectors, which are described below.

WO scheduler 258 may match cost estimates for different resource types for a work order to available time slots in an allocation schedule across different network elements (e.g., hardware/software components that perform underlying operations for a work unit). As a result of the scheduling, WO scheduler 258 may output start and end times for each of the work unit tasks and for resource reservations.

Runtime resource manager 260 may allocate network elements/user groups to a process at the time of execution on behalf of a work unit. Runtime resource manager 260 may attempt to honor scheduled reservations of resources. However, if the resources are unavailable, runtime resource manager 260 may attempt to obtain replacement resources.

Metrics collector 262 may determine or adjust, for each work unit, actual time of completion and used/consumed resources. Based on the previous actual execution measurements, metrics collector 262 may modify factors that are used to estimate the resource and time necessary to complete a task associated with a work unit for a particular asset.

In an exemplary implementation, resource management system 250 may represent the functions performed by various NEs used to execute work order tasks as resource types and represent the capacity of the NEs using resource capacity units (RCUs). The term "resource type," as used herein, may include categories of consumable network resources used to schedule, reserve, bill and manage network capacity. Examples of resource types include bandwidth, storage, and the ability to transcode an asset from one format into another format. Resource types may also include resources associated with humans involved in the processing of assets, such as a human's ability to review a movie asset, etc. The term "RCU", as used herein, may include the unit of measure for a resource type. Examples of RCUs include megabits for bandwidth, gibabytes for storage, transcoding task units (e.g., CPU processing time) for transcoding operations, etc.

DDC work order execution (WOE) system 270 may include one or more servers or computing devices to manage the flow and execution of work units of a defined workflow associated with a work order. DDC WOE system 270 may include a workflow (WF) command processor 272 (also referred to herein as command processor 272), a work unit processor, work unit (WU) adapters 274, and network elements 276. For simplicity, FIG. 2 does not show other components of WOE system 270. Depending on the implementation, DDC WOE system 270 may include additional, fewer, or different components than those illustrated in FIG. 2.

Command processor 272 may drive work order execution. Command processor 272 may include a WO manager and WO processor. The WO manager may provide interfaces to resource management system 250 for initiating an execution of a work order, retrieving the status of the work order, suspending/resuming the work order execution, canceling the work order, etc. The WO processor may coordinate work unit tasks for completion of a work order. In coordinating different work unit tasks, the WO processor may sequence the tasks for optimum execution time and resource utilization. The WO processor may communicate with runtime resource manager 260 for allocation and de-allocation of resources. The work unit processor may dispatch processes/threads to perform a work unit task.

Work unit adapter 274 may include interfaces for adapting network elements to perform media content processing corresponding to a work unit. In one implementation, each work unit adapter 274 may be versioned and may include Java code. Each work unit adapter 274 may monitor the corresponding network element to prevent over-allocation of the network element, maintain normal execution of logic associated with the network element, and provide real-time information to metrics collector 262.

Network elements 276 may include physical or logical network devices/components for processing media content.

DDC support system 290 may include one or more servers or computing devices and/or personnel to provide support services, such creation of work units, composition of workflows, etc., billing support, contracting management, pricing, etc.

The configuration shown in FIG. 2 is for illustrative purposes. In other configurations and/or implementations, functions that are associated with one component or system shown in FIG. 2 may be performed by one or more other components in FIG. 2, any of the components may be connected to any other of the components, and functions of one component may be included in another component. Accordingly, in the other configurations or implementations, DDC 150 may include additional, fewer, different, or a different arrangement of components than those illustrated in FIG. 2.

Figure 3:
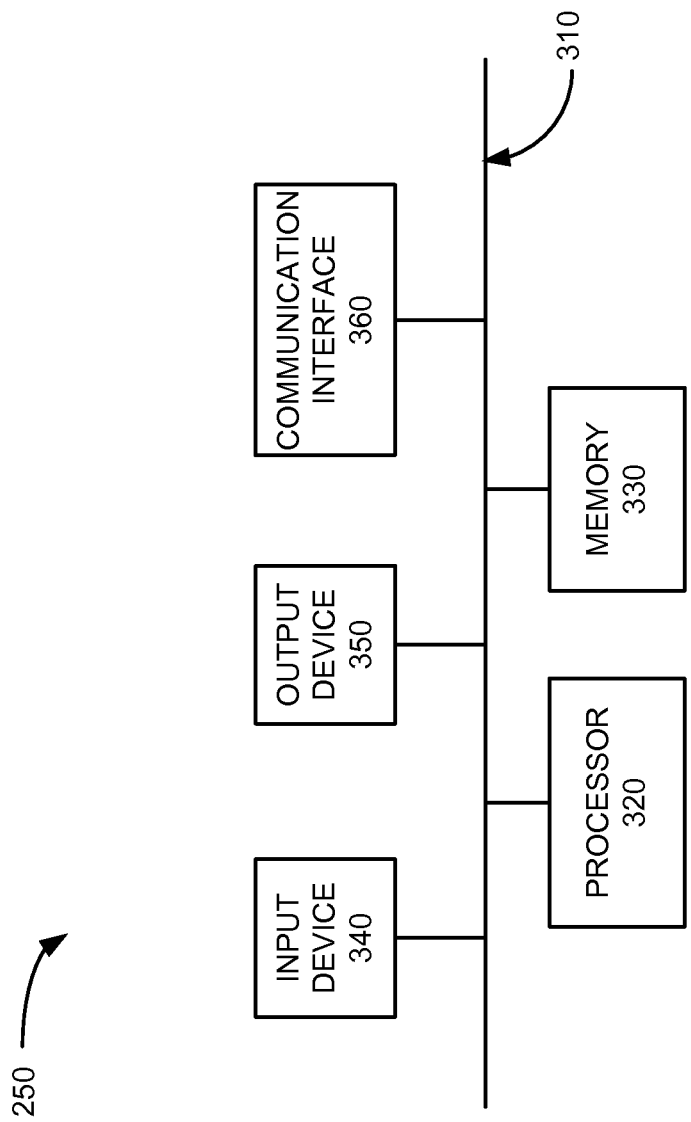
FIG. 3 illustrates an exemplary configuration of one or more of the components of FIG. 2.

FIG. 3 illustrates an exemplary configuration of one or more devices on which DDC resource management system 250 and/or components of DDC resource management system 250 may be implemented. For example, one or more of WO server 252, WO estimator 254, WO decomposer and optimizer 256, WO scheduler 258, runtime resource manager 260 and metrics collector 262 may be implemented on one or more devices configured as illustrated in FIG. 3. Other components in DDC 150, such as components in order management system 220, data and security system 230, DDC SOM system 240, DDC work order execution system 270 and DDC support system 290 may be configured in a similar manner. Referring to FIG. 3, DDC resource management system 250 (or one or more components of DDC resource management system 250) may include bus 310, processor 320, memory 330, input device 340, output device 350 and communication interface 360. Bus 310 may include a path that permits communication among the elements of DDC resource management system 250.

Processor 320 may include one or more processors, microprocessors, or processing logic that may interpret and execute instructions. Memory 330 may include a random access memory (RAM) or another type of dynamic storage device that may store information and instructions for execution by processor 320. Memory 330 may also include a read only memory (ROM) device or another type of static storage device that may store static information and instructions for use by processor 320. Memory 330 may further include a solid state drive (SDD). Memory 330 may also include a magnetic and/or optical recording medium (e.g., a hard disk) and its corresponding drive.

Input device 340 may include a mechanism that permits a user to input information to DDC resource management system 250, such as a keyboard, a keypad, a mouse, a pen, a microphone, a touch screen, voice recognition and/or biometric mechanisms, etc. Output device 350 may include a mechanism that outputs information to the user, including a display, a printer, a speaker, etc.

Communication interface 360 may include a transceiver for communicating with other devices within system 250 or outside system 250 (e.g., order management system 220, DDC WOE system 270, databases 210) via wired, wireless or optical mechanisms. Communication interface 360 may also include one or more radio frequency (RF) transmitters, receivers and/or transceivers and one or more antennas for transmitting and receiving RF data via network 100. Communication interface 360 may also include a modem or an Ethernet interface to a LAN or other mechanisms for communicating with elements in a network or system, such as network 100 or system 150, or another network/system.

The exemplary configuration illustrated in FIG. 3 is provided for simplicity. It should be understood that devices in system 250 may include more or fewer devices than illustrated in FIG. 3. In an exemplary implementation, one or more components of system 250 may perform operations in response to processor 320 executing sequences of instructions contained in a computer-readable medium, such as memory 330. A computer-readable medium may be defined as a physical or logical memory device. The software instructions may be read into memory 330 from another computer-readable medium (e.g., a hard disk drive (HDD), SSD, etc.), or from another device via communication interface 360. Alternatively, hard-wired circuitry may be used in place of or in combination with software instructions to implement processes consistent with the implementations described herein. Thus, implementations described herein are not limited to any specific combination of hardware circuitry and software.

As described above, resource management system 250 receives orders associated with, for example, content creators 110 that wish to package and distribute the content to consumers 140 via a number of different communication channels and having a number of different formats. Resource management system 250 may estimate the capacity required to complete work orders and reserve capacity to complete the work orders. Resource management system 250 may also schedule and allocate resources in real time to fulfill customer orders, as described in detail below.

Figure 4:
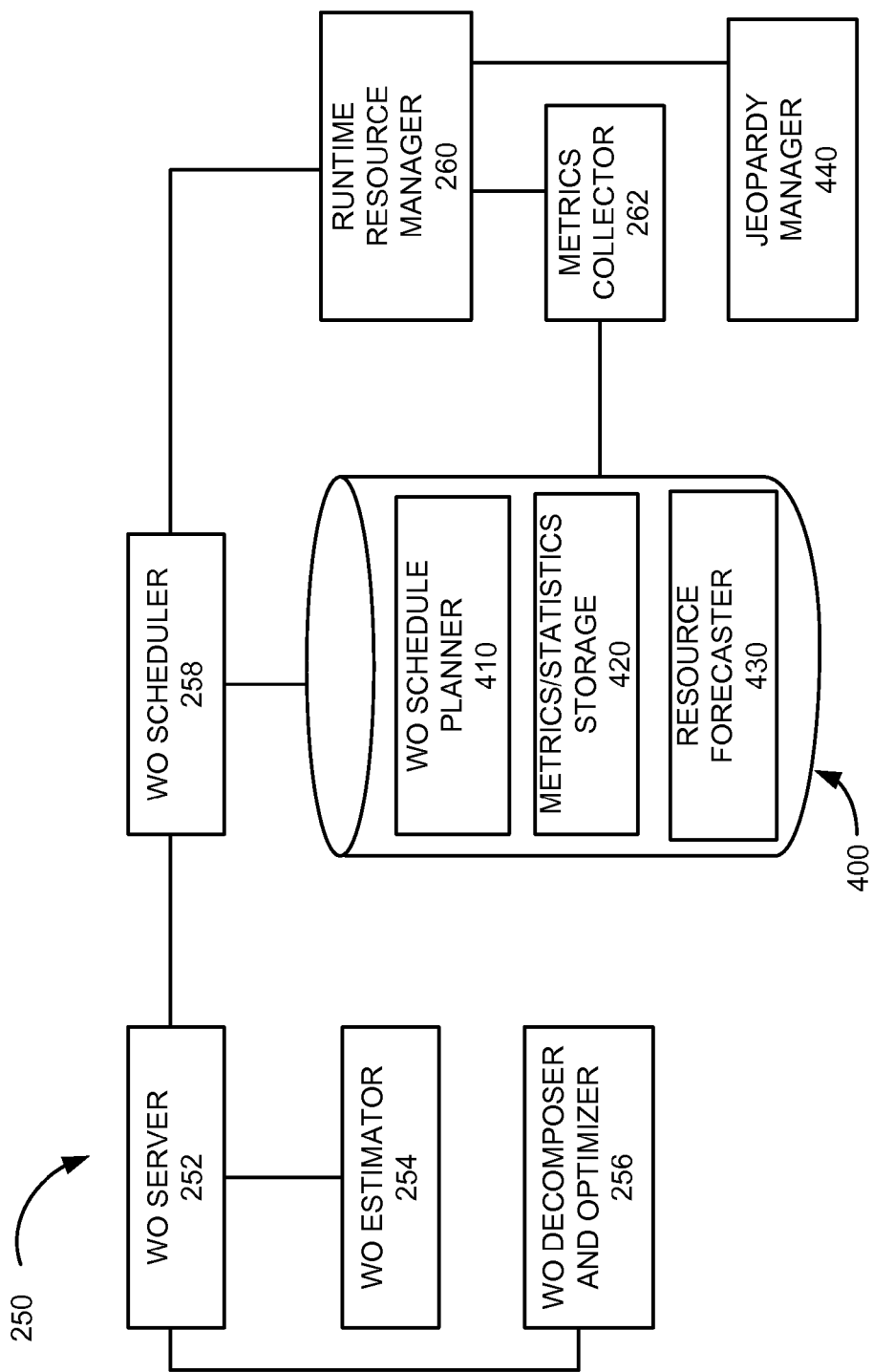
FIG. 4 illustrates a more detailed view of the exemplary architecture of FIG. 2.

FIG. 4 illustrates a more detailed view of resource management system 250 illustrated in FIG. 2. As discussed above with respect to FIG. 2, resource management system 250 may include WO server 252, WO estimator 254, WO decomposer and optimizer 256, WO scheduler 258, runtime resource manager 260 and metrics collector 262. As illustrated in FIG. 4, resource management system 250 may also include databases 400 and jeopardy manager 440.

Databases 400 may include WO schedule planner 410, metrics and statistics storage 420 and resource forecaster 430. Each of elements 410-430 may be a separate database. For example, WO schedule planner 410 may store schedule information associated with a number of different work orders, along with resource information identifying resources reserved to fulfill the scheduled work orders. Metrics and statistics storage 420 may include a database storing actual completion times by work unit processes and resource type associated with executed work orders. The information in metrics and statistics storage 420 may have been collected and/or stored by metrics collector 262.

Resource forecaster 430 may include a database storing information associated with capacity usage in DDC 150. For example, resource forecaster 430 may store information identifying whether capacity usage within DDC 150 is trending upward, whether the percentage utilization of resources (e.g., NEs) is within some system/network tolerance, whether the percentage utilization of resources is decreasing, etc. Runtime resource manager 260 and/or WO scheduler 258 may access resource forecaster 430 to generate exhaust dates for NEs/user groups (UGs) by resource type information associated with work orders to be executed.

WO server 252, as described briefly above, may include one or more servers or computing devices that act to coordinate processing associated with a work order. For example, WO server 252 may receive an order from order management system 220. WO server 252 may include interfaces (e.g., application programming interfaces (APIs)) to communicate with WO estimator 254, WO decomposer and optimizer 256 and WO scheduler 258. In an exemplary implementation, WO server 252 may use the information received from WO estimator 254 and WO decomposer and optimizer 256 and provide information to other components in resource management system 250 (e.g., WO scheduler 258) to aid in scheduling and reserving capacity for executing work orders.

As described above, resource management system 250 may represent the functions performed by various NEs as resource types. Resource management system 250 may also represent the capacity of the NEs using resource capacity units (RCUs). WO estimator 254 includes logic to estimate the number of RCUs needed for a decomposed work order across the work units based on the associated assets and/or quantities by asset type. For example, WO decomposer and optimizer 256 may include logic to break down or convert customer orders received by WO server 252 into work orders (WOs). In an exemplary implementation, WO decomposer and optimizer 256 may break down a work order using a work flow and preset parameter settings associated with the order to generate work unit tasks (WUTs), task parameters and task connectors that define constituent tasks and functions that must be executed to fulfill a customer order.

WO decomposer and estimator 256 may forward a decomposed work order to WO server 252, which may save the work order. The WO may include an associated list of assets and/or quantities by asset type. WO estimator 254 may use the decomposed work order and associated list of assets to generate a rough order of magnitude (ROM) estimate for the work order, as described below.

WO estimator 254 may include logic to receive a decomposed work order from WO server 252 and generate an estimate associated with the decomposed work order. In an exemplary implementation, WO estimator 254 may provide an estimate based on an associated list of assets and/or quantities by asset type for the decomposed work order. For example, WO estimator 254 may use the list of assets associated with the WO to generate an ROM estimate. The ROM estimate generated by WO estimator 254 may include RCU estimates and time duration estimates for all resource types and all work units in the selected work flow. These RCUs may then be used with other information (e.g., a rate table) to establish a high level cost estimate to complete the entered order. In some implementations, the cost estimate and/or time estimate for completing the work order may be provided to the customer to allow the customer to determine whether to approve the estimate.

In an exemplary implementation, by classifying an asset into types (e.g., asset types), customers and/or a DDC operator may not have to be aware of the size and duration of assets (e.g., the length of a movie) associated with various customer requests. More specifically, DDC 150 (e.g., order management system 220) provides a list of normalized asset types that can be used. For estimation purposes, WO estimator 254 uses asset type information associated with what a content creator 110 provides during order entry to establish an ROM estimate, timeline information and/or a cost estimate. As an example, an asset type may be CableLabs (CL) compliant, MP2, approximately 2 hours, 4 GB, movie class. In this example, the customer may know that the asset associated with the order is a movie stored in a CL compliant format, is approximately two hours in duration and has a size of about 4 gibabytes (GB). However, the customer (or DDC operator) does not have to be aware of more detailed information regarding the asset.

WO decomposer and optimizer 256, as described briefly above, receives information provided by order management system 220. In an exemplary implementation, WO decomposer and optimizer 256 establishes mappings from the work flow and quantities of assets to resource types and RCU reservations against NEs and User Groups (UGs) needed to execute the work flow. Work units may be instantiated in a database for each work order as tasks to be performed. WO decomposer and optimizer 256 may also generate task connectors that represent configured connectors in the work flow. Using presets/parameter selections across the work unit tasks for a particular work order, along with the selected asset types/quantities, WO estimator 254 may generate estimates by resource type for each work unit task in the work order, as described in more detail below.

Figure 5A:
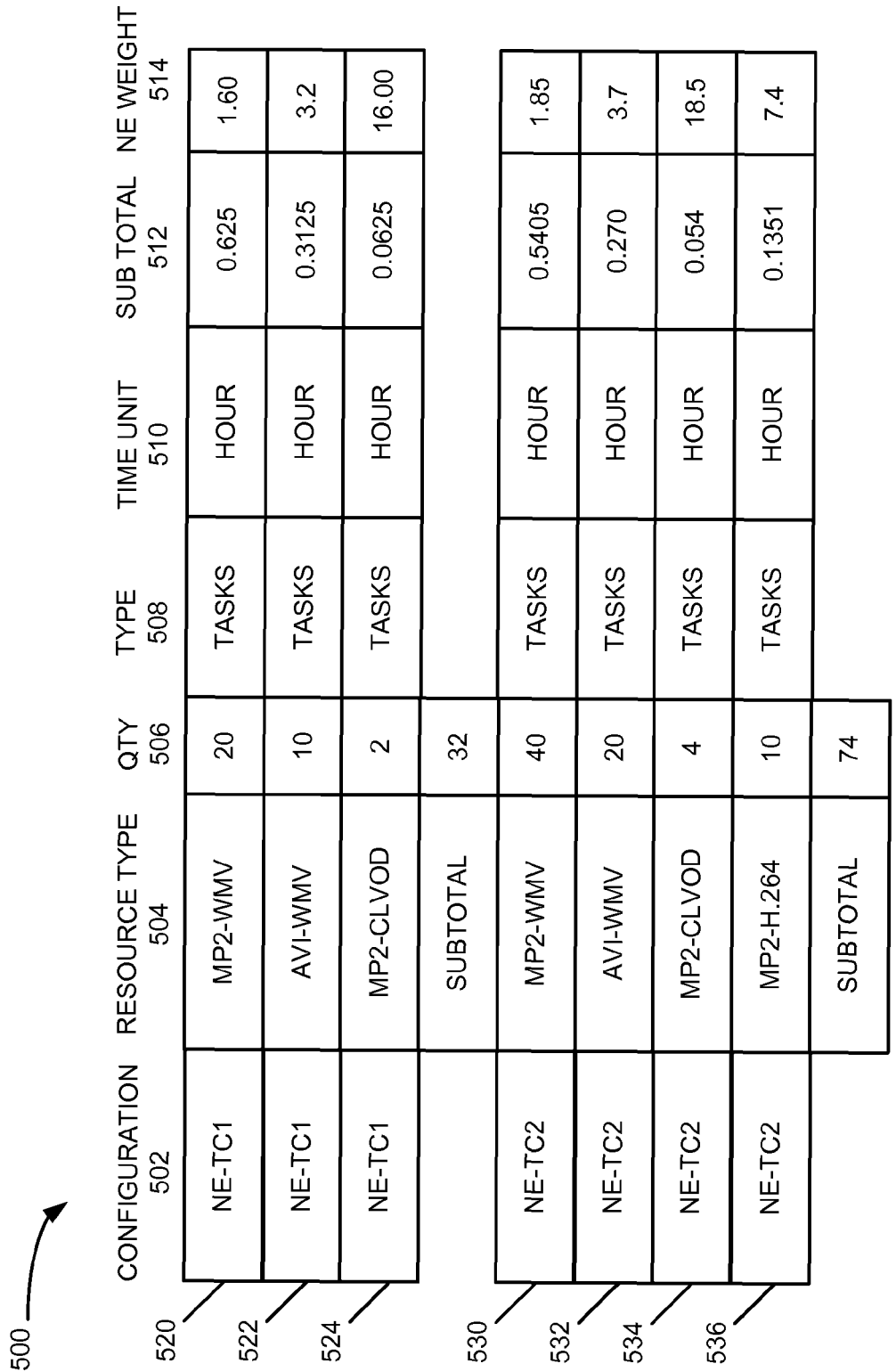
FIG. 5A illustrates an exemplary configuration table associated with estimating resources available to fulfill work orders.

In an exemplary implementation, NEs can provide multiple functions and each resource type that an NE can provide may be stored in a table or database. For example, FIG. 5A illustrates an exemplary table 500 storing information associated with two NEs (i.e., transcoder (TC) 1 and TC2) that may be used to transcode assets from one format into another format. Table 500 may be stored in databases 210 (FIG. 2). As illustrated in FIG. 5A, table 500 may include configuration field 502, resource type field 504, quantity field 506, type field 508, time unit field 510, sub-total field 512 and NE weight field 514. Configuration field 502 may represent the configuration of an NE and resource type field 504 may identify a resource/function provided by the NE in field 502. For example, TC1 and TC2 may represent the configuration of two NEs (i.e., transcoders in this example) that provide a common set of functions as illustrated in entries 520-524 and 530-536, respectively. That is, TC1 and TC2 both provide functions associated with transcoding content having an MP2 format into a windows media video (WMV) format (illustrated by entries 520 and 530), transcoding content having an audio video interleave (AVI) format into a WMV format (illustrated by entries 522 and 532), transcoding content having an MP2 format into a CableLabs compliant video on demand (CLVOD) format (illustrated by entries 524 and 534). TC2 may also transcode content having an MP2 format into a H.264 format, as illustrated by entry 536.

Quantity field 506 represents the number of RCUs available for the resource type. In this example, type field 508 and time unit field 510 indicate that the RCUs for TC1 and TC2 are represented as tasks per hour. The RCU value in field 506 may represent a maximum allocation that the NE/TC in field 502/504 can provide if it was only providing that resource type. For example, when NE-TC2 has a reservation for 20 RCUs for resource type AVI-WMV, all of the capacity associated with TC2 is consumed by the AVI to WMV transcoding and the other three resource types that TC2 is capable of providing (i.e., MP2-WMV, MP2-CLVOD, MP2-H.264) are no longer available.

Table 500 may also include weighting information for each task. For example, the values in sub-total field 512 for each NE add up to 1.0, and each value in field 512 represents the portion of total RCUs available for the particular resource type. For example, the value of 0.625 in field 512 of entry 520 represents the 20 RCUs available for MP2-WMV transcoding divided by the 32 total RCUs for TC1 (i.e., 20/32). NE weight field 514 is an inverse of the value in subtotal field 512. For example, the value in NE weight field 514 of entry 520 is 1/0.625 or 1.6, as illustrated in FIG. 5A. The weighting information may be used when calculating estimated RCUs needed to perform a task. As an example, if NE-TC2 is reserved for AVI-WMV transcoding, the available 20 RCUs will be multiplied by the weighting factor of 3.7 (illustrated in field 514 of entry 532) to generate a value of 74 as the total number of RCUs consumed. In other words, WO estimator 254 may multiply the weighting factor in field 514 by the RCU value in field 506 to generate a value identifying an estimated total RCUs consumed when performing a task.

In an exemplary implementation, reservations for NEs are made against particular NEs since NEs are multi-functional with respect to resource type, as illustrated in table 500. As a result, use of one function will impact the capacity of other resource types. For example, when NE-TC2 has a reservation for 20 AVI-WMV, all of the capacity is consumed and the other three resource types illustrated in entries 530, 534 and 536 of table 500 are no longer available. As a result, when NE-TC2 has a reservation for 20 RCUs for AVI-WMV transcoding, the availability associated with MP2-WMV transcoding for NE-TC1 and NE TC2 is reduced from 60 to 20. That is, the 40 RCUs identified in field 506 of entry 530 are no longer available.

Figure 5B:
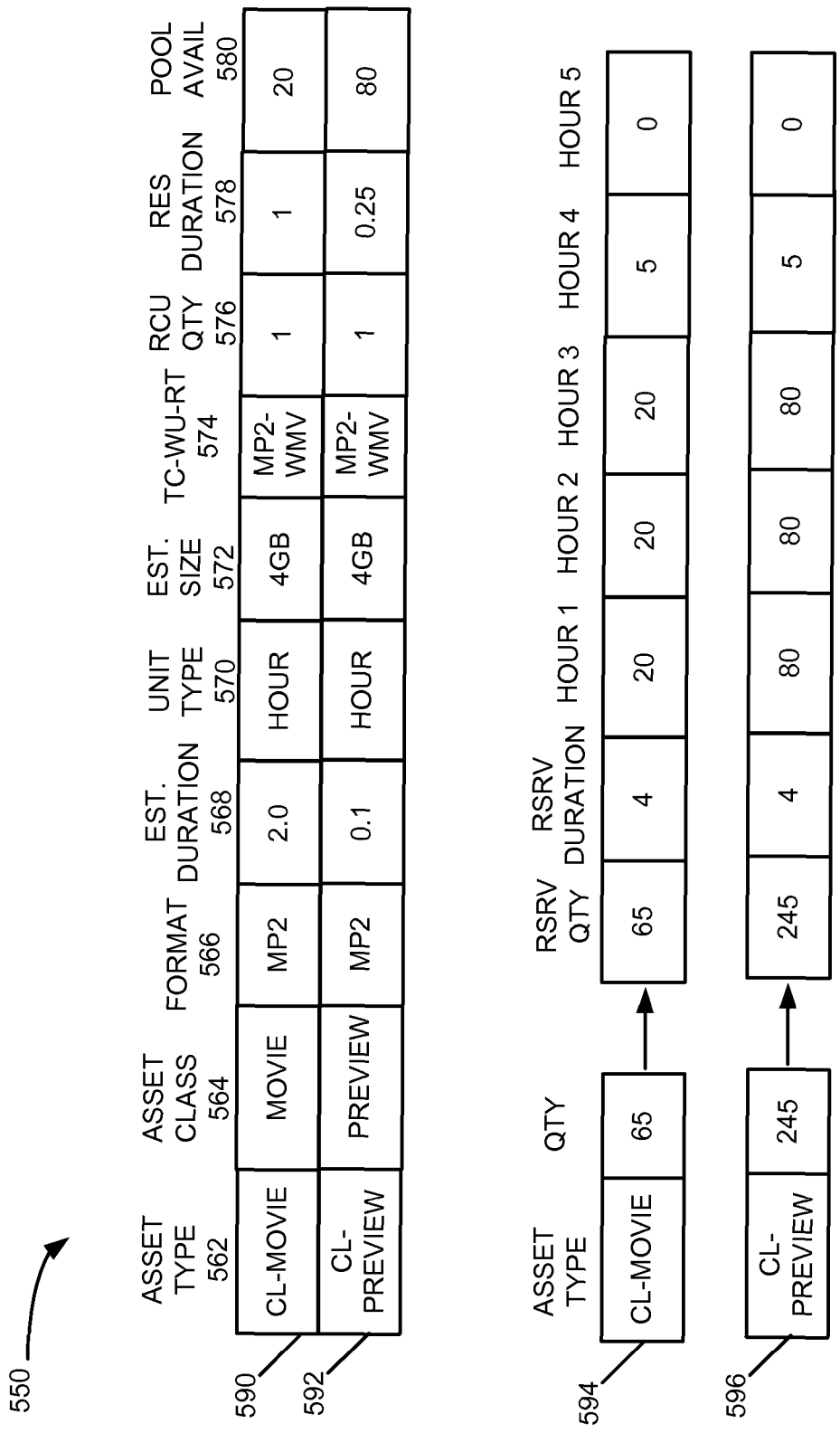
FIG. 5B illustrates an exemplary table associated with identifying resources used to estimate and/or fulfill exemplary orders.

WO estimator 254 may also establish a mapping between configured asset types and RCU quantity and duration required to complete processing of the resource type. For example, FIG. 5B illustrates a mapping performed by WO estimator 254. As illustrated, table 550 illustrates asset type information used to generate an estimate for an order. Referring to FIG. 5B, table 550 includes asset type field 562, asset class field 564, format field 566, estimated duration field 568, unit type field 570, estimated size field 572, resource type field 574, RCU quantity field 576, reservation duration field 578 and pool availability field 580.

Entry 590 in table 550 stores information indicating that a CL compliant movie provided in MP2 format has an estimated duration of 2 hours and an estimated size of 4 GB. Entry 590 also indicates that transcoding the CL movie from MP2 format into a WMV format will consume 1 RCU for a 1 hour duration and that the available pool of RCUs is 20 per hour. Similarly, entry 592 in table 550 stores information indicating that a CL compliant movie preview originally provided in MP2 format has an estimated duration of 0.1 hours and an estimated size of 4 GB. Entry 592 also indicates that transcoding the CL movie preview from MP2 format to WMV format will consume 1 RCU for 0.25 hours and that the available pool of RCUs is 80 per hour.

Continuing with this example, suppose that a work order from a customer indicates that 65 CL compliant movies are to be transcoded from MP2 to WMV format, as indicated in entry 594 in FIG. 5B. In this case, WO estimator 254 indicates a resource reservation requirement of 65 RCUs (i.e., 1 RCU for each of the 65 movies) and reservation duration of 4 hours, as illustrated by entry 594. That is, since 20 RCUs per hour are available, in each of hours 1-3, 20 movies may be transcoded (as illustrated in FIG. 5B), resulting in consumption of 60 RCUs. In hour 4, the last five movies may be transcoded, for a total of 65 movies being transcoded in four hours.

Similarly, suppose that a work order from a customer indicates that 245 CL compliant previews are to be transcoded from MP2 to WMV format, as indicated in entry 596 in FIG. 5B. In this case, WO estimator 254 indicates a resource reservation requirement of 245 RCUs and reservation duration of 4 hours, as illustrated by entry 596. That is, since 80 RCUs per hour are available, in each of hours 1-3, 80 movie previews may be transcoded, resulting in consumption of 80 RCUs. In hour four, the last five movie previews may be transcoded, for a total of 245 movie previews being transcoded in four hours.

In an exemplary implementation, WO estimator 254 may also take into consideration human resources (referred to herein as users) when generating estimates. For example, users may be associated with user groups (UGs) that perform various functions associated with executing work flows. For example, one UG may perform tasks, such as reviewing and approving work orders. Another group may be associated with performing assemblies associated with work flows that may require concatenating assets, as well as performing reviews and approvals. WO estimator 254 may map UGs to resource types for completing the necessary tasks to complete a work order.

Figure 6:
FIG. 6 illustrates an exemplary table associated with estimating human resources associated with fulfilling orders.

For example, FIG. 6 is an exemplary table 600 illustrating resource to resource type breakdown associated with human resources. WO estimator 254 may access table 600 (e.g., a human resource task table) to establish a normalized capacity for the functions (e.g., resource types) that a human resource can complete per unit of time. In an exemplary implementation, a one hour time unit may be initially configured with respect to table 600. Table 600 may be used to estimate RCUs associated with human resources.

Referring to FIG. 6, table 600 includes resource field 602, resource type field 604 and plan quantity field 606. Resource field 602 may identify individual users, field 604 may identify resource types (e.g., functions) that may be performed by the user in field 602 and plan quantity field 606 may identify the estimated RCUs for each resource type.

For example, entry 610-1 indicates that resource/user Bob performs approvals and reviews and that the RCUs for these resource types take an estimated 50 and 20 RCUs, respectively. As further illustrated in entry 610-3, resource/user Joe performs approvals, reviews and assemblies and that the RCUs for these tasks consume an estimated 50, 20 and 10 RCUs, respectively. The total plan RCUs for the five users illustrated in table 600 are 280.

In addition, WO estimator 254 may establish a plan weight by function associated with UGs (similar to that described above for NEs). However, allocation of human resources may be at the UG level instead of being associated specific users. In this manner, tasks can be performed by any user of the User Group as long as his/her access is sufficient. For example, one user group may include Bob, Mary and Joe, and a second user group may include Joe, Susan and Reza. In this case, Joe may overlap into both of the UGs.

WO estimator 254 may also review schedule information and based on the RCUs and duration required, provide estimated start and end date times for each work unit task, and as a result, provide an estimated start/end time for the entire work order. In an exemplary implementation, WO estimator 254 does not make any resource reservations regarding NEs/UGs. That is, resource reservation may be performed by other components (e.g., WO scheduler 258, runtime resource manager 260, etc.). WO estimator 254 may also generate estimated cost information, as described in more detail below.

WO scheduler 258 may include logic to match the estimates of each resource type required for each work unit for a work order into a timed schedule of allocations across network elements and user groups. For example, WO scheduler 258 may generate scheduled start/end times for each work unit task and resource reservations per its priority. WO scheduler 258 may store this information in WO schedule planner 410.

Referring back to FIG. 4, runtime resource manager 260 may include logic to interface with command processor 272 (FIG. 2) when allocating network elements/user groups at the time of execution. For example, runtime resource manager 260 may allocate network elements/user groups to a process at the time of execution on behalf of a work unit. Runtime resource manager 260 may also attempt to honor scheduled reservations of resources stored in WO schedule planner 410. However, if the resources are unavailable, runtime resource manager 260 may attempt to obtain replacement resources, as described in detail below.

Metrics collector 262, as described briefly above, may include logic that receives actual completion times by work unit and resource type from WO execution module. This information may be stored in metrics and statistics storage 420 and used to refine estimates for future work orders.

Jeopardy manager 440 may include logic that monitors ongoing work order processing. For example, jeopardy manager 440 may monitor actual completion metrics against expected completion rates/metrics. In one implementation, jeopardy manager 440 may trigger alarms and/or notices if the completion rates are beyond an acceptable threshold or will impact completion date/times of work orders in process or those that are scheduled for later execution.

As described above, resource management system 250 may break down customer orders into work unit tasks associated with a workflow and estimate time and/or costs associated with executing an order in accordance with the workflow. Resource management system 250 may also manage resources and scheduling information associated with network elements (NEs) and UGs in DDC 150, as described in more detail below.

Figure 7:
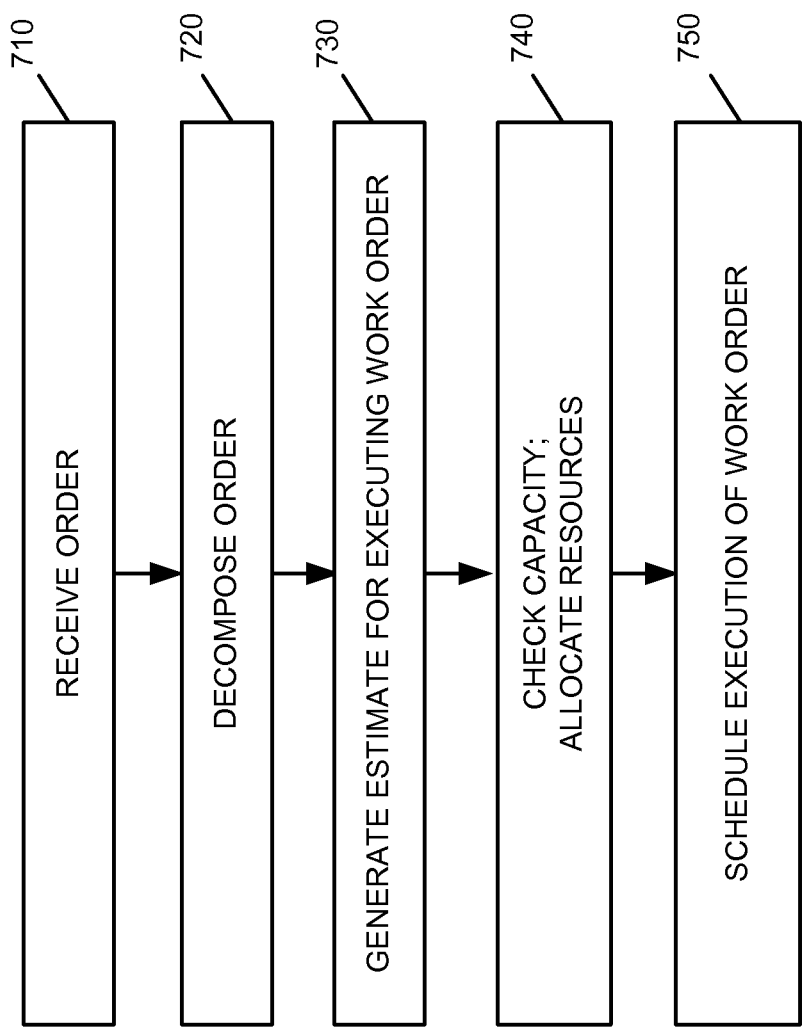
FIG. 7 is a flow diagram illustrating exemplary processing associated with an order.

FIG. 7 is an exemplary flow diagram illustrating processing associated with resource management system 250. Processing may begin with resource management system 250 receiving an order (act 710). For example, WO server 252 may receive a customer order from order management system 220. WO server 252 may forward the order to WO decomposer and optimizer 256.

WO decomposer and optimizer 256 may decompose the order (act 720). For example, as described above, WO decomposer and optimizer 256 may break down the customer order into a WO based on the associated work flow and preset parameter settings. In an exemplary implementation, WO decomposer and optimizer 256 may generate work unit tasks, task parameters and task connectors based on the work flow. After decomposing the work order, WO optimizer and decomposer 256 may forward the decomposed work order to WO server 252.

WO server 252 may received the decomposed work order and save the decomposed work order. WO server 252 may also forward the decomposed WO to WO estimator 254. WO estimator 254, as described above, may generate an estimate associated with executing the work order (act 730). For example, WO estimator 254 may generate an estimate of the number of RCUs needed for each work unit task and store the RCU estimate with the work unit task in WO schedule planner 410. WO estimator 254 may also store an approximate time duration for each task. WO estimator 254 may also review the schedule of work orders awaiting execution and based on RCUs and duration required, and provide an estimated start and end time for each work unit task, and as a result, for the entire work order. In an exemplary implementation, the estimated start and end times for each work unit task will not "lock" in the date/time for execution of the work units. That is, no resource reservation entries are made in a resource reservation schedule by WO estimator 254.

Figure 8:
FIG. 8 is an exemplary table associated with generating a billing estimate for an order.

WO estimator 254 may further provide an estimated cost for the WO using, for example, a rate table, such as rate table 800 illustrated in FIG. 8. Referring to FIG. 8, table 800 may include billing plan field 802, rate group field 804, rate element field 806, rate field 808 and unit type field 810. Billing plan field 802 may include information indicating whether the task is performed on a standard basis, expedited basis, emergency basis or some other basis. The particular billing plan information stored in field 802 may be based on the time frame with which a customer wishes to have an order fulfilled.

Rate group field 804 may indicate the task or work unit to be executed, such as ingest, transcode, quality assurance, etc. Rate element field 806 may include more particular information associated with rate group 804. For example, rate element field 806 may indicate particular tasks to be performed, such as transcoding, storage, inspection, etc. Rate field 808 may include a rate per RCU. In this example, the rate may be in dollars per RCU. Unit type field 810 may include units associated with the rate element, such as task or storage units (e.g., megabytes). As an example, entry 820-4 indicates that an expedited transcoding from MP2 to WMV format has a cost of $4.00 per RCU.

WO estimator 254 may use rate table 800 to generate a cost estimate for each task in a work order, and total the costs for each task to generate an overall estimate for the customer order. The cost estimate may be provided to the customer prior to the customer approving the order. In addition, the estimated schedule information associated with fulfilling the order may be provided to the customer to allow the customer to approve/reject the order based on the estimated completion time.

WO server 252 may also forward the work order to WO scheduler 258. WO scheduler 258 may receive the work order and check capacity associated with NEs and UGs needed to execute the work order (act 740). For example, WO scheduler 258 may access WO schedule planner 410 to identify and allocate resources for executing the tasks/work units of the work order (act 740).

Figure 9:
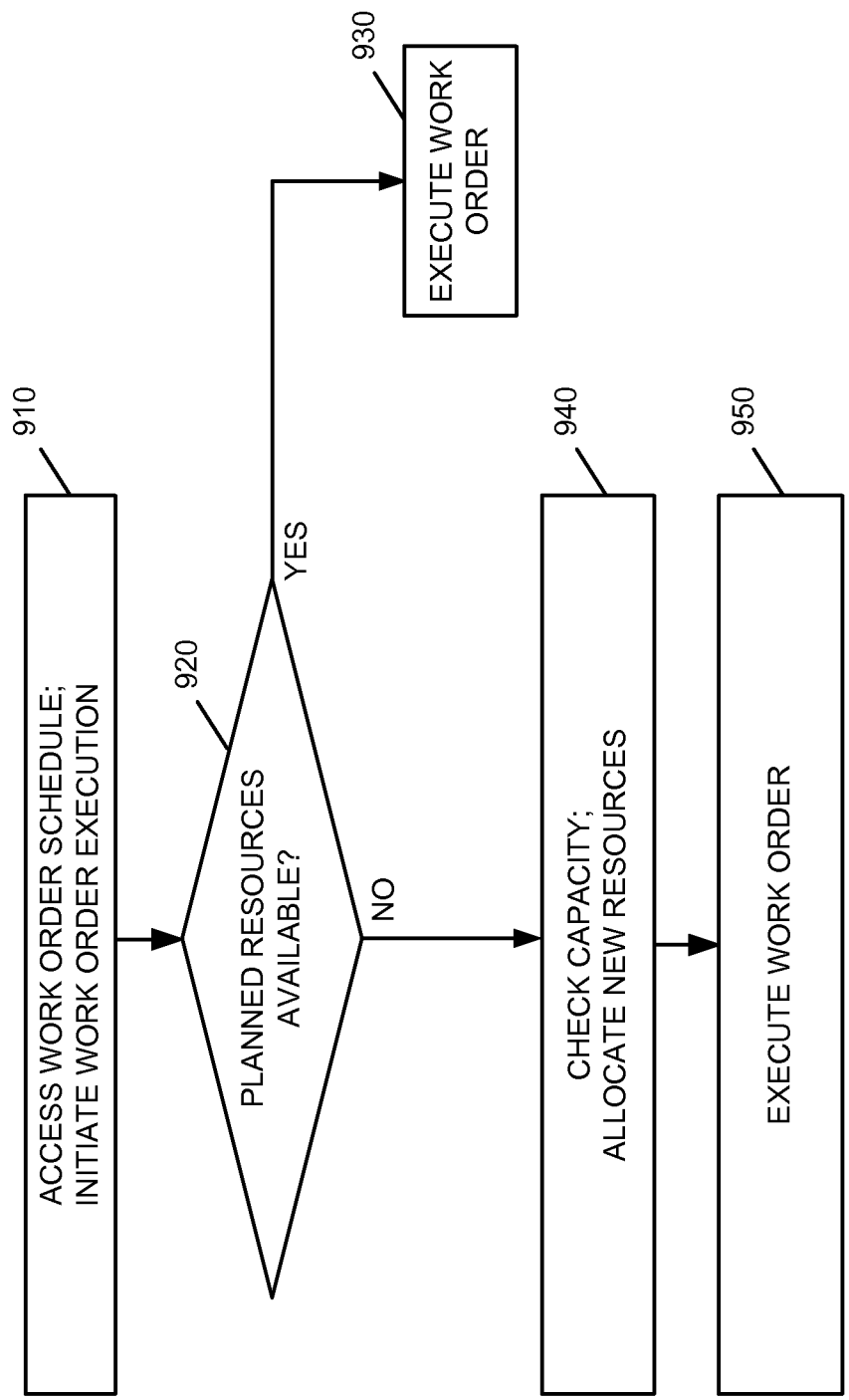
FIG. 9 is a flow diagram illustrating exemplary processing associated with executing a work order.

WO scheduler 258 may then schedule execution of the WO (act 750). For example, WO scheduler 258 may match the estimates of each resource type required for each work unit into a timed schedule of allocations across the NEs and user groups. WO scheduler 258 may generate scheduled start/end times for each work unit task and reserve resources based on its priority. WO scheduler 258 may store the schedule information in WO schedule planner 410. WO scheduler 258 may also change the state of the work order to submitted/scheduled after all tasks have been scheduled. In some implementations, a DDC operator may approve the work order prior to the state of the work order changing to submitted/scheduled. After a work order is scheduled, runtime resource manager 260 may interact with DDC WOE system 270 to facilitate execution of the work order, as described in detail below. FIG. 9 illustrates exemplary processing associated with execution of a scheduled work order. Processing may begin with runtime resource manager 260 accessing a schedule of work orders (act 910). For example, runtime resource manager 260 may automatically access WO schedule planner 410 at regular intervals to identify any work order that is ready for execution at or near the current time. In this case, assume that a work order is ready for execution. Runtime resource manager 260 may initiate the execution of the work order (act 910).

For example, runtime resource manager 260 may allocate NEs/UGs at the time of execution. In one implementation, runtime resource manager 260 may determine if the planned/schedule resources stored by WO scheduler 258 in WO schedule planner 410 are currently available (act 920). That is, runtime resource manager 260 may attempt to honor the resources that were reserved by WO scheduler 258 during scheduling. For example, runtime resource manager 260 may check the current capacity to determine if planned resources are still available to fulfill the tasks in the work order. In some implementations, runtime resource manager 260 may also determine if the available resources minus the sum of the allocated resources plus the resources required for the particular task is not a negative value. If the reserved resources are available (act 920—yes), runtime resource manager 260 may execute the work order (act 930). That is, runtime resource manager 260 may signal WOE system 270 to execute the work unit tasks of the work order using the reserved resources. Runtime resource manager 260 may also update a calendar and the state of the corresponding resource reserve schedule with the actual start time of the execution.

If, however, the resources are not available at the time of execution (act 920—no), runtime resource manager 260 may check current capacity associated with NEs/UGs and attempt to allocate alternate resources as necessary (act 940). For example, suppose that a task associated with transcoding an asset has reserved TC1 as the transcoder to be used. Further assume that TC1 is busy/unavailable at the scheduled time, but that TC2 is available. In this case, runtime time resource manager 260 may identify TC2 as being the transcoder to be used for the transcoding task, as opposed to TC1. In each case, runtime resource manager 260 may allocate alternative resources if possible. In other instances, runtime resource manager 260 may schedule the work order, or tasks associated with the work order at a different time.

In this example, assume that runtime resource manager 260 has identified alternative resources and reserved the alternative resources. Runtime resource manager 260 and/or WOE system 270 may execute the work order (act 950). For example, runtime resource manager 260 may signal WOE system 270 to execute the work order using the reserved resources.

Figure 10:
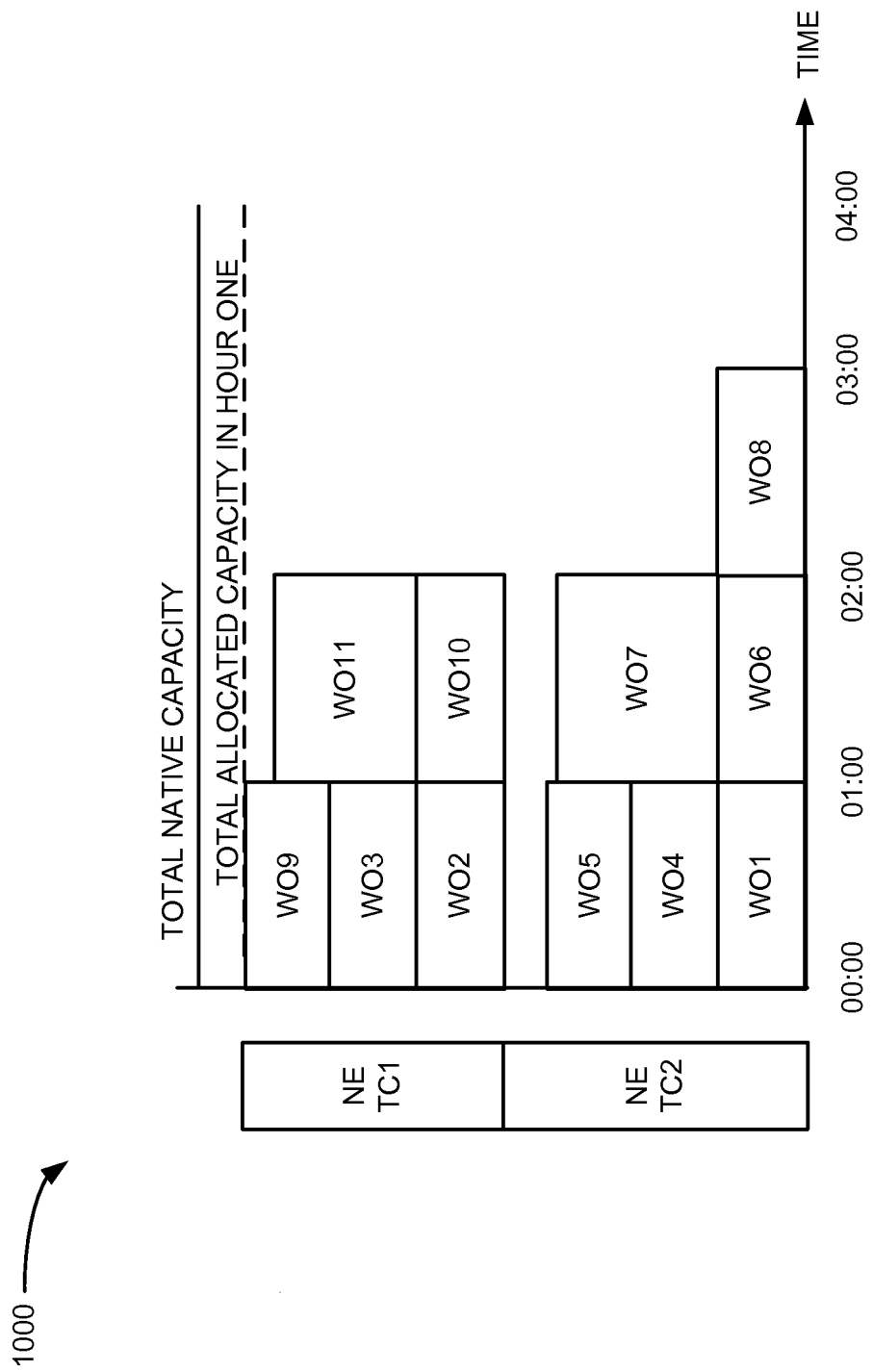
FIG. 10 is an exemplary timeline associated with executing work orders.

In an exemplary implementation, WO scheduler 258 and/or runtime resource manager 260 ensures that schedules are established to provide high utilization of network elements. For example, FIG. 10 illustrates an example in which two NEs (i.e., TC1 and TC2) are scheduled to execute tasks associated with 11 different work orders (i.e., WOs 1-11). As illustrated, TC2 may execute tasks associated with WO1, WO4 and WO5 in hour number one. Concurrently, TC1 may execute tasks associated with WO2, WO3 and WO9 in hour number one. In hour two, TC2 may execute tasks associated with WO6 and WO7 and TC1 may execute tasks associated with WO10 and WO11. In hour three, TC2 may execute tasks associated with WO8. In this manner, WO scheduler 258 may overlap schedules to allow TC1 and TC2 to be used in an efficient manner. As illustrated, the total allocated capacity associated with use of TC1 and TC2 in hour number one is close to the total native or overall capacity of TC1 and TC2. The total allocated capacity, of TC1 and TC2 however, varies more greatly from the total native capacity in hours two and three in this example.

As described above, resource management system 250 may decompose, schedule and estimate work orders. In addition, in some implementations, WO decomposer and optimizer 256 may take into consideration optimizations that may be performed with regard to asset re-use within a work order. For example, WO decomposer and optimizer 256 may re-use assets that have been previously processed and that are still available in working storage or are available to be pulled from an archive to avoid re-processing a task through quality assurance, transcoding, encryption, etc. That is, if an asset has already been processed and may be used by another workflow/task, or by the same workflow task (when a problem has occurred during processing), the asset may be re-used.

WO decomposer and optimizer 256 may also take into account work units that may be performed in parallel, as opposed to work units that must be performed in a pipelined or serial manner. WO decomposer and optimizer 256 may use any such parallel processing to compress the overall execution time of a work order. In this manner, WO decomposer and optimizer 256 may streamline work order processing.

Implementations described herein provide an infrastructure that allows customer orders to be broken down into work unit tasks. Resource management system 250 may then generate estimated time and/or costs associated with executing the tasks, as well as allocate resources to fulfill each of the tasks. Resource management system 250 may also manage resources and automatically schedule resources to execute the tasks.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, features have been described above with respect to resource management system 250 performing various tasks to process orders, provide estimates and schedule/reserve resources for executing the tasks. In other implementations, other components, systems, platforms, etc., in DDC 150 may perform these tasks. In addition, in some implementations, network 100 may include multiple DDCs 150.

In addition, tasks associated with a work order that involves transcoding a media file have been described above. It should be understood that other types of orders may be processed by DDC 150. For example, other types of orders may include inserting advertisements, logos or watermarks into a media file, concatenating a second media file to the media file (e.g., concatenating episodes of a series together), inserting black space into at least a portion of the media file, performing audio transcoding on the media file, performing image/audio overlay on the media file, etc.

Further, while series of acts have been described with respect to FIGS. 7 and 9, respectively, the order of the acts may be varied in other implementations. Moreover, non-dependent acts or signal flows may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessors, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A computer-implemented method, comprising:
   receiving, by at least one processing device, an order associated with processing a media file;
   generating, by the at least one processing device, a workflow associated with fulfilling the order;
   identifying, by the at least one processing device, a plurality of tasks associated with the workflow;
   generating, by the at least one processing device, an estimate associated with executing the plurality of tasks;
   allocating, by the at least one processing device, resources for executing the plurality of tasks;
   scheduling, by the at least one processing device, execution of the order;
   determining, by the at least one processing device at execution time, whether the allocated resources are available; and
   identifying, by the at least one processing device, alternate resources to execute the order, in response to determining that the allocated resources are not available, wherein the plurality of tasks comprise:
   transcoding the media file from a first format into at least one other format, and
   inserting advertisements into the transcoded media file.

2. The computer-implemented method of claim 1, further comprising:
   executing the order; and
   storing metrics associated with execution times for each of the plurality of tasks.

3. The computer-implemented method of claim 2, further comprising:
   accessing the stored metrics to generate estimates associated with execution of other orders.

4. The computer-implemented method of claim 1, wherein the generating an estimate comprises:
   generating a time estimate and a cost estimate associated with fulfilling the order.

5. The computer-implemented method of claim 4, further comprising:
   providing the time and cost estimates to a customer associated with the order.

6. The computer-implemented method of claim 4, wherein the generating a cost estimate comprises:
   identifying a plurality of network elements associated with executing the plurality of tasks,
   estimating a first number of resource capacity units (RCUs) associated with executing the plurality of tasks by the plurality of network elements, wherein estimating the first number of RCUs comprises:
      estimating a number of RCUs associated with executing each of the plurality of tasks, wherein an RCU corresponds to a unit of measure for a network element to execute one of the plurality of tasks, and
      adding the number of RCUs associated with each of the plurality of tasks, and
   correlating the first number of RCUs to an overall cost associated with the order.

7. The computer-implemented method of claim 6, wherein the generating a cost estimate further comprises:
   estimating human factors involved in fulfilling the order,
   estimating a second number of RCUs associated with the human factors involved in executing at least one of the plurality of tasks,
   adding the second number of RCUs to the first number of RCUs to generate a total number of RCUs, and
   correlating the total number of RCUs to the overall cost associated with fulfilling the order.

8. The computer-implemented method of claim 1, further comprising:
   executing the order using the allocated resources, in response to determining that the allocated resources are available.

9. The computer-implemented method of claim 1, further comprising:
   executing the order; and
   monitoring, while the order is executing, completion times or completion rates associated with the plurality of tasks.

10. The computer-implemented method of claim 9, further comprising:
    determining whether the completion times or completion rates will impact a scheduled completion time of an other order; and
    generating an alarm indication in response to determining that the completion time or completion rate will impact the scheduled completion time of the other order.

11. The computer-implemented method of claim 1, wherein the determining whether the allocated resources are available comprises:

identifying a plurality of resources associated with executing the plurality of tasks, and
determining whether resource capacity units associated with each of the plurality of resources are available at execution time.

12. A system, comprising:
a memory configured to store resource information associated with a plurality of resources used to fulfill orders; and
at least one processing device configured to:
receive an order associated with processing a media file,
generate a workflow associated with fulfilling the order,
identify a plurality of tasks associated with the workflow,
generate an estimate associated with executing the plurality of tasks,
allocate resources for executing the plurality of tasks,
schedule execution of the plurality of tasks,
determine, at a scheduled execution time, whether the allocated resources are available, and
automatically identify alternate resources to execute the tasks, in response to determining that the allocated resources are not available, wherein the plurality of tasks comprise:
transcoding the media file from a first format into at least one other format, and inserting advertisements into the transcoded media file.

13. The system of claim 12, wherein the at least one processing device is further configured to:
generate a time estimate and a cost estimate associated with fulfilling the order.

14. The system of claim 12, wherein the at least one processing device is further configured to:
determine, at execution time, whether the allocated resources are available, and
execute the tasks using the allocated resources, in response to determining that the allocated resources are available.

15. The system of claim 12, wherein when determining whether the allocated resources are available, the at least one processing device is configured to:
access the memory to identify some of the plurality of resources associated with executing the plurality of tasks, and
determine whether resource capacity units associated with the identified some of the plurality of resources are available at the scheduled execution time.

16. A method, comprising:
receiving, by at least one processing device, an order associated with processing a media file;
identifying, by the at least one processing device, a plurality of tasks associated with fulfilling the order;
generating, by the at least one processing device, an estimate associated with executing the plurality of tasks;
allocating, by the at least one processing device, resources for executing the plurality of tasks;
storing, by the at least one processing device, a scheduled execution time for the order;
determining, by the at least one processing device at or before the scheduled execution time, whether the allocated resources are available; and
automatically identifying, by the at least one processing device, alternate resources to execute the order, in response to determining that the allocated resources are not available, wherein the plurality of tasks comprise:
transcoding the media file from a first format into at least one other format, and
inserting advertisements into the transcoded media file.

17. The method of claim 16, further comprising:
executing, by the at least one processing device, the order using the allocated resources, in response to determining that the allocated resources are available.

18. The method of claim 16, wherein the determining whether the allocated resources are available comprises:
identifying a plurality of resources associated with executing the plurality of tasks, and
determining whether resource capacity units associated with each of the plurality of resources are available at the scheduled execution time.

* * * * *